(12) United States Patent
Lu et al.

(10) Patent No.: US 11,431,232 B2
(45) Date of Patent: Aug. 30, 2022

(54) DEVICE FOR INSERTING INSULATING SLEEVES INTO WIRING SLOTS OF FLAT WIRE MOTOR STATOR

(71) Applicant: Huizhou Lingbiao Precision Machinery Co. LTD., Guangdong (CN)

(72) Inventors: Qilong Lu, Guangdong (CN); Yunfu Luo, Guangdong (CN); Yibing Xiong, Guangdong (CN); Fangliang He, Guangdong (CN); Qiusheng Cheng, Guangdong (CN)

(73) Assignee: Huizhou Lingbiao Precision Machinery Co. LTD., Huizhou (CN)

( * ) Notice: Subject to any disclaimer, the term of this patent is extended or adjusted under 35 U.S.C. 154(b) by 355 days.

(21) Appl. No.: 16/505,604

(22) Filed: Jul. 8, 2019

(65) Prior Publication Data

US 2020/0076283 A1 Mar. 5, 2020

(30) Foreign Application Priority Data

Aug. 31, 2018 (CN) .......................... 201811010541.7

(51) Int. Cl.
| | |
|---|---|
| *H02K 15/10* | (2006.01) |
| *H02K 3/34* | (2006.01) |
| *H02K 15/085* | (2006.01) |
| *H02K 15/02* | (2006.01) |

(52) U.S. Cl.
CPC ............. *H02K 15/10* (2013.01); *H02K 3/345* (2013.01); *H02K 15/02* (2013.01); *H02K 15/085* (2013.01)

(58) Field of Classification Search
CPC ....... H02K 15/10; H02K 15/085; H02K 15/02
See application file for complete search history.

(56) References Cited

U.S. PATENT DOCUMENTS

| | | | | |
|---|---|---|---|---|
| 3,742,596 A | * | 7/1973 | Smith .................. | H02K 15/068 29/596 |
| 3,778,889 A | * | 12/1973 | Mason .................. | H02K 15/10 29/593 |
| 6,564,444 B1 | * | 5/2003 | Ponzio .................. | H02K 15/10 29/407.1 |
| 2012/0248926 A1 | * | 10/2012 | Guercioni ............. | B29C 53/043 310/215 |

FOREIGN PATENT DOCUMENTS

| | | | | |
|---|---|---|---|---|
| CN | 203562913 U | * | 4/2014 | |
| CN | 105490479 A | | 4/2016 | |
| CN | 205304546 U | * | 6/2016 | |

(Continued)

*Primary Examiner* — Donghai D Nguyen
*Assistant Examiner* — Jose K Abraham

(57) ABSTRACT

An insulation sleeve insertion device for inserting insulating sleeves into wiring slots of a flat wire motor stator, comprising a processing panel, a feeder, a conveying mechanism comprising conveyor belts, a positioning mechanism comprising a limit ring and a positioning turntable, a guide mechanism comprising a plurality of second guide rails, a clamping mechanism comprising a drive rod, a positioning plate set, and a drive mechanism comprising a second driver, wherein the clamping mechanism is configured to insert insulating sleeves into wiring slots of the flat wire motor stator through the guide mechanism.

5 Claims, 4 Drawing Sheets

(56) References Cited

FOREIGN PATENT DOCUMENTS

| | | | | |
|---|---|---|---|---|
| CN | 105978262 | A | * | 9/2016 |
| CN | 106160371 | A | | 11/2016 |
| CN | 106451953 | A | * | 2/2017 |
| CN | 108390526 | A | * | 8/2018 |
| CN | 109167454 | A | | 1/2019 |
| CN | 109327096 | A | | 2/2019 |
| KR | 20030058929 | A | * | 7/2003 |

* cited by examiner

DEVICE FOR INSERTING INSULATING SLEEVES INTO WIRING SLOTS OF FLAT WIRE MOTOR STATOR

CROSS-REFERENCE TO RELATED APPLICATIONS

This application claims the benefit of priority from Chinese Patent Application No. CN201811010541.7, filed on Aug. 31, 2018. The content of the aforementioned application, including any intervening amendments thereto, is incorporated herein by reference in its entirety.

TECHNICAL FIELD

The present invention relates to techniques for inserting insulating sleeves into wiring slots for windings of automobile drive motor stators or electric generator stators, and more particular to a method and device for inserting insulating sleeves into wiring slots of a flat wire motor stator.

BACKGROUND OF THE INVENTION

Windings of flat wire motors adopt rectangular wires and are often embedded into stator wiring slots in an insert manner. The existing method is to insert insulating paper sleeves into the stator wiring slots before the windings are inserted into the stators, and then to insert the windings into the insulating paper sleeves, ensuring insulation reliability between lacquered flat wires. Different insulating materials and techniques make different insulating structures in flat wire motor stators. The insulating structure mainly serves for electrical insulation. Due to the factors such as electricity, heat, machinery and environment, the insulating structure gradually ages during long-term operations, resulting in unsafe operation of motors. Therefore, the insulation is an important factor to determine the operation of the motors.

In the prior art, the method for inserting the insulating paper sleeves into the slots of the flat wire motor stator includes the following steps. Firstly, strips or sheets of the whole insulating paper are folded to form creases by mechanical equipments, and then the insulating paper is served above the stator slots and is mechanically cut into small sections which are then folded into a tube shape. Finally, the insulting paper sleeves are formed by hot press, and then are inserted into the stator slots. A plurality of insulating paper sleeves need to be inserted into one stator slot, which has a low efficiency by inserting one by one. Moreover, the specifications of the formed insulating paper sleeves are not easy to control, and there is a seam at ends of the insulating paper sleeve formed by the bending method, which has a certain influence on the insulation of the windings. At the same time, the larger number of wires in the slot results in a lower space factor, so that it is difficult to show the advantage of high space filling factor of the flat wire motor stator, and the flexibility for designing the winding size is restricted to some extent.

SUMMARY OF THE INVENTION

In view of the above, the present invention provides a method and device for inserting insulating sleeves into wiring slots of a flat wire motor stator, which can solve the problems of low efficiency and insulation instability of insertion of insulating sleeves for wiring slots of a flat wire motor stator in the prior art, thereby greatly improving the production efficiency.

A method for inserting insulating sleeves into wiring slots of a flat wire motor stator, comprising:

S1: selecting a plurality of insulating sleeves matched with a size of wiring slots of a flat wire motor stator, and pre-processing the insulating sleeves to a length by cutting according to a size of the flat wire motor stator;

S2: fixing the flat wire motor stator into a positioning plate set;

S3: placing the pre-processed insulating sleeves into a feed mechanism, and conveying the pre-processed insulating sleeves through a conveying mechanism to a positioning mechanism located behind the conveying mechanism;

S4: clamping and transmitting, by a clamping mechanism, the insulating sleeves in the positioning mechanism above the wiring slots of the flat wire motor stator;

S5: moving a guide mechanism above the flat wire motor stator in the positioning plate set, wherein S5 is synchronized with S4;

S6: inserting, by the clamping mechanism, the insulating sleeves into the wiring slots of the flat wire motor stator through the guide mechanism;

S7: fully inserting the insulating sleeves into the wiring slots of the flat wire motor stator by a leveling mechanism; and S8: removing the flat wire motor stator, and putting in another flat wire motor stator; resetting these mechanisms, and repeating S1 to S7.

Further, the insulating sleeves are inserted into the wiring slots of the flat wire motor stator by one, two or more processes.

Further, the insulating sleeve is a spiral composite insulating sleeve, an extruded insulating sleeve or an injection forming insulating sleeve.

Further, the insulating sleeve is any one or two of a carbon fiber insulating sleeve, a glass fiber insulating sleeve, a PET insulating sleeve, a PI insulating sleeve and a plastic insulating sleeve.

A device for inserting insulating sleeves into wiring slots of a flat wire motor stator, comprising a processing panel and a drive mechanism. A feed mechanism, a conveying mechanism, a positioning mechanism, a clamping mechanism, a guide mechanism and a positioning plate set are provided on the processing panel. The feed mechanism is provided on one side of the processing panel and is connected with the conveying mechanism provided below the feed mechanism. An end of the conveying mechanism is connected with the positioning mechanism, and one side of the positioning mechanism is provided with the clamping mechanism. The positioning plate set is symmetrically provided on the other side of the processing panel, and one side of the positioning plate set is provided with the guide mechanism.

In the present invention, the drive mechanism comprises a first drive mechanism, a second drive mechanism, a third drive mechanism, a fourth drive mechanism, a fifth drive mechanism, a sixth drive mechanism and a seventh drive mechanism. The drive device of the present invention can be implemented by any of the prior art.

Further, a plurality of first guide rails are symmetrically provided on both sides of the processing panel, and are connected with the first drive mechanism which is provided below the first guiding rails. A rack is provided on the first guide rails, and a first positioning rod and a first transmission rod are symmetrically provided at the rack. The first transmission rod is provided with the clamping mechanism which is connected with the first positioning rod, and the first transmission rod is connected with the sixth drive mechanism. A plurality of baffles are symmetrically provided at a front side of the rack, and the second positioning rod and the second transmission rod are symmetrically provided between the baffles.

Further, the conveying mechanism comprises a first conveyor belt and a second conveyor belt. The first conveyor belt is connected to the second conveyor belt in an L-shape. Specifically, the first conveyor belt and the second conveyor belt are connected in an L-shaped by a steering mechanism in the prior art for conveying.

Further, a material guide plate is symmetrically provided on the first conveyor belt. Specifically, the material guide plate is V-shaped and is provided on the first conveyor belt, so that insulating conduits are facilitated to slide into a middle of the first conveyor belt.

Further, the positioning mechanism comprises a limit ring and a positioning turntable. The positioning turntable is sleeved in the limit ring which is coaxial with the positioning turntable. One side of the limit ring is provided with an opening. Surfaces of the positioning turntable are symmetrically provided with a limit groove. The insulating sleeves enter the limit groove of the positioning turntable through the opening of the limit ring, and at the same time, the positioning turntable is continuously rotated until the insulating sleeves fill the limit groove.

Further, the clamping mechanism comprises a drive rod. One end of the drive rod is connected with the third drive mechanism, and the other end of the drive rod is connected with a rotary part having a clamping member, and a plurality of metal inserts are symmetrically provided on a surface of the clamping member. Specifically, a length of the metal insert is ¼-⅓ of the length of the insulating sleeve, and the metal inserts are fitted with the insulating sleeves in a interference fit, which can ensure a stable clamping of the insulating sleeves, and at the same time, the clamping mechanism can be easily withdrawn after the insulating sleeves are inserted into the wiring slots of the flat wire motor stator. The metal inserts are provided corresponding to the limit groove of the positioning turntable. In the clamping mechanism of the present invention, the drive rod drives the rotary member to be laterally arranged, so that the clamping member faces the positioning mechanism; and then the sixth drive mechanism drives the transmission rod to push the clamping mechanism forward to partially insert the metal inserts into the insulating sleeves. Then the clamping mechanism clamped with the insulating sleeves is reset. The drive rod drives the rotary part to be vertically arranged. The first drive mechanism drives the rack to move forward along the first guide rails, so that the rack is located above the positioning plate set. At the same time, the guide plate of the guiding mechanism is moved above the positioning plate set. The third drive mechanism drives the clamping member to move downwards. The insulating sleeves are inserted into the wiring slots of the flat wire motor stator in the positioning plate set along a plurality of spaced slots in the guide ring.

Further, the guide mechanism comprises a plurality of second guide rails opposite to each other. A second drive mechanism is provided at a rear of the second guide railshaving a guide plate, so that the guide plate can move back and forth.

Further, the guide plate is provided with an arc opening having a guide ring. The spaced slots are symmetrically provided in the guide ring. The guide plate is configured to provide a guide support force before the insulating sleeves are inserted into the wiring slots of the flat wire motor stator, so that the insulating sleeves are easy to be inserted into the wiring slots of the flat wire motor stator.

Further, the device of the present invention further comprises the leveling mechanism provided above the positioning plate set. The leveling mechanism comprises a horizontal transmission portion provided at the second transmission rod, and one end of the horizontal transmission portion is connected to the second positioning rod. The horizontal transmission portion is provided with a processing seat provided with a vertical transmission portion, and a leveling plate is provide Dbelow the vertical transmission portion. The second transmission rod is connected to the fourth drive mechanism, and the vertical transmission portion is provided with the fifth drive mechanism. When the plurality of insulating sleeves have been fully inserted into the plurality of wiring slots of the flat wire motor stator, all workpieces are reset for a next repeat cycle. At the same time, the leveling mechanism is moved above the wiring slots of the flat wire motor stator in the positioning plate set to be leveled by the horizontal transmission portion, and then the processing seat is pressed down by the vertical transmission portion, so that the insulating sleeves are fully inserted into the wiring slots of the flat wire motor stator. The leveling mechanism is reset, and the flat wire motor stator is removed from the positioning plate set by a mechanical hand, and another flat wire motor stator is inserted in the positioning plate set, so that it is inserted with the insulating sleeves.

The operation process of the present invention is as follows. The insulating sleeves are put into the feed mechanism, and the motor drives the feed mechanism to vibrate and swing back and forth, so that the insulating sleeves sequentially fall into the first conveyor belt, and then are conveyed to the second conveyor belt in order. Since the second conveyor belt is continuously driven, the insulating sleeves enter the limit groove of the positioning turntable. The insulating sleeves are sequentially arranged at a certain angle by the rotation of the positioning turntable, and then the drive mechanism drives the clamping mechanism to the positioning turntable to take out the insulating sleeves by inserting the metal inserts into the insulating sleeves. The clamping mechanism is moved above the flat wire motor stator in the positioning plate set for inserting the insulating sleeves. Before the insert, the guide mechanism is configured to guide the insulating sleeves, so that the insulting sleeves can be successfully inserted into the wiring slots of the flat wire motor stator in one or multiple times (several strips of the insulating sleeves can be arranged in the stator slot at a same time). When the insulting sleeves are fully inserted into the wiring slots of the flat wire motor stator, the clamping mechanism is withdrawn, and the guide mechanism is removed, and the other mechanisms are reset. The drive mechanism drives the leveling mechanism to level the inserted sleeves according to requirements, and then the flat wire motor stator is taken out. The above operation is repeated for inserting the sleeves.

The present invention adopts the inventive method of directly inserting the insulating sleeves into the wiring slots of the flat wire motor stator to replace the conventional method in which the insulating paper sleeve is formed by the insulting paper and then is inserted into the wiring slot of the flat wire motor stator. It can ensure that the insulating sleeves to be inserted have a same size, and there is no gap on the formed insulating sleeves, having a better insulating performance. The present invention greatly improves the processing efficiency by inserting the sleeves into the wiring slots of the flat wire motor stator in batches. Compared to the conventional method in which all wiring slots of the flat wire motor stator is filled in 5 minutes, the method of the present invention can be completed in 10-20 seconds, so that the space factor of the flat wire motor is ensured, providing the flexibility for designing the size of the winding wire.

DETAILED DESCRIPTION OF EMBODIMENTS

Figure 1:
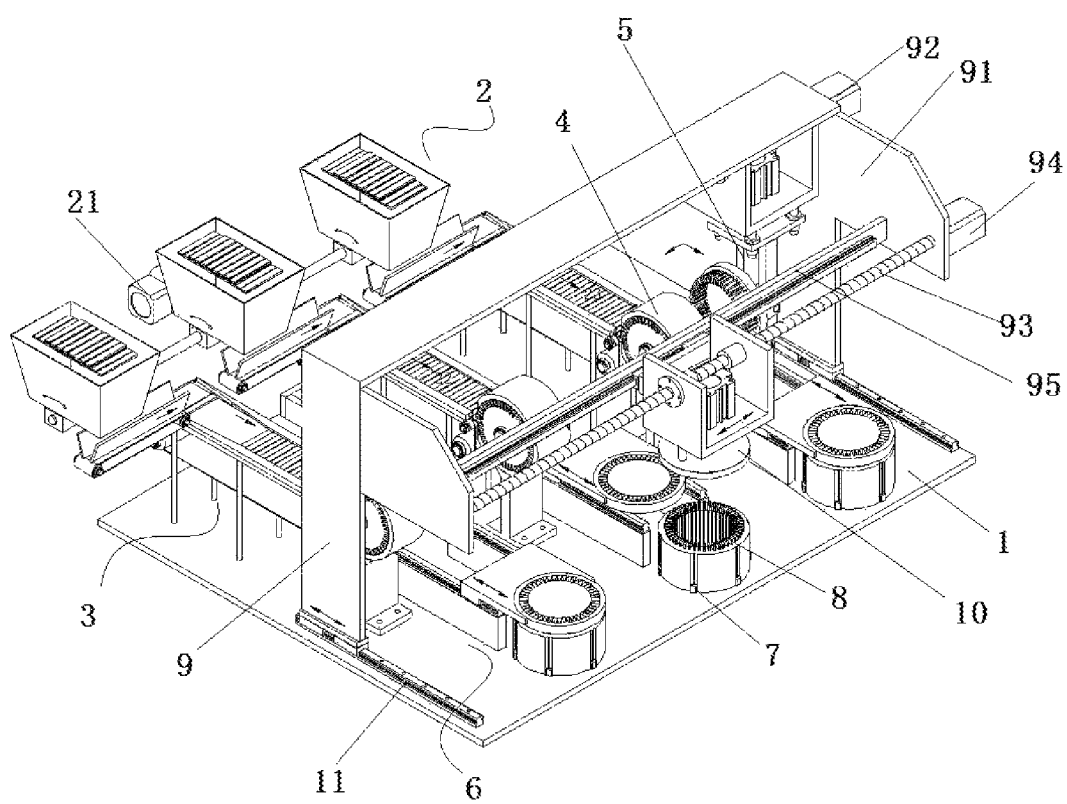
FIG. 1 is a schematic diagram of a device for inserting insulating sleeves into wiring slots of a flat wire motor stator according to the present invention.
Figure 2:
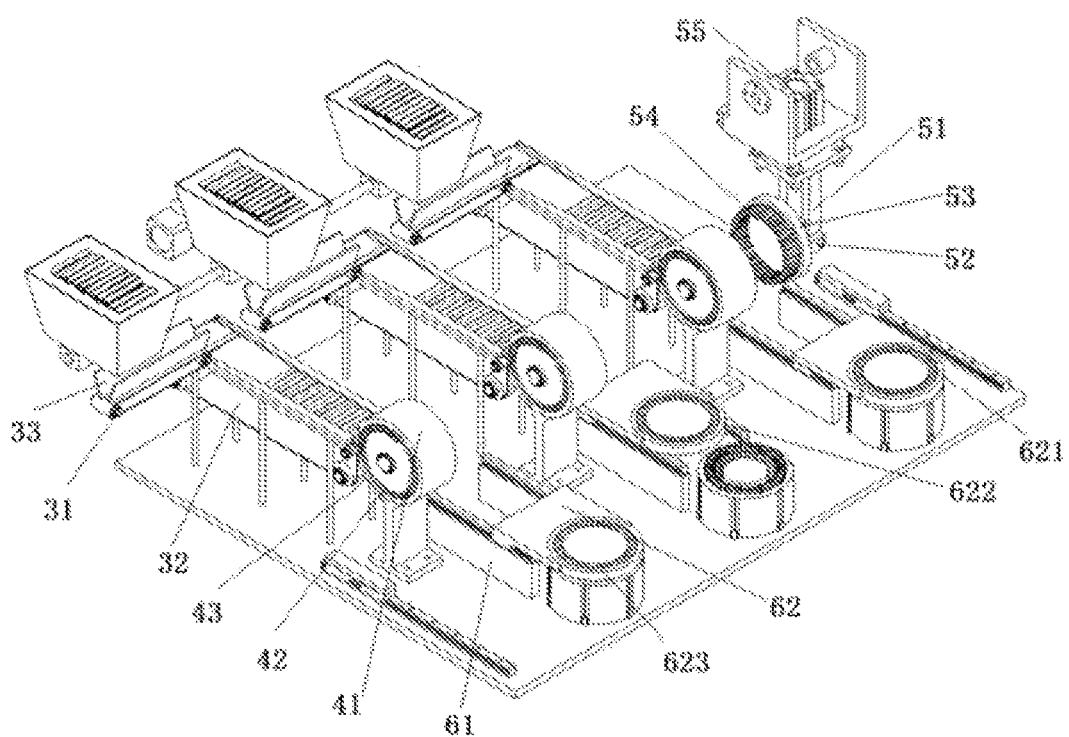
FIG. 2 is a partial schematic diagram of the device for inserting the insulating sleeves into the wiring slots of the flat wire motor stator according to the present invention.
Figure 3:
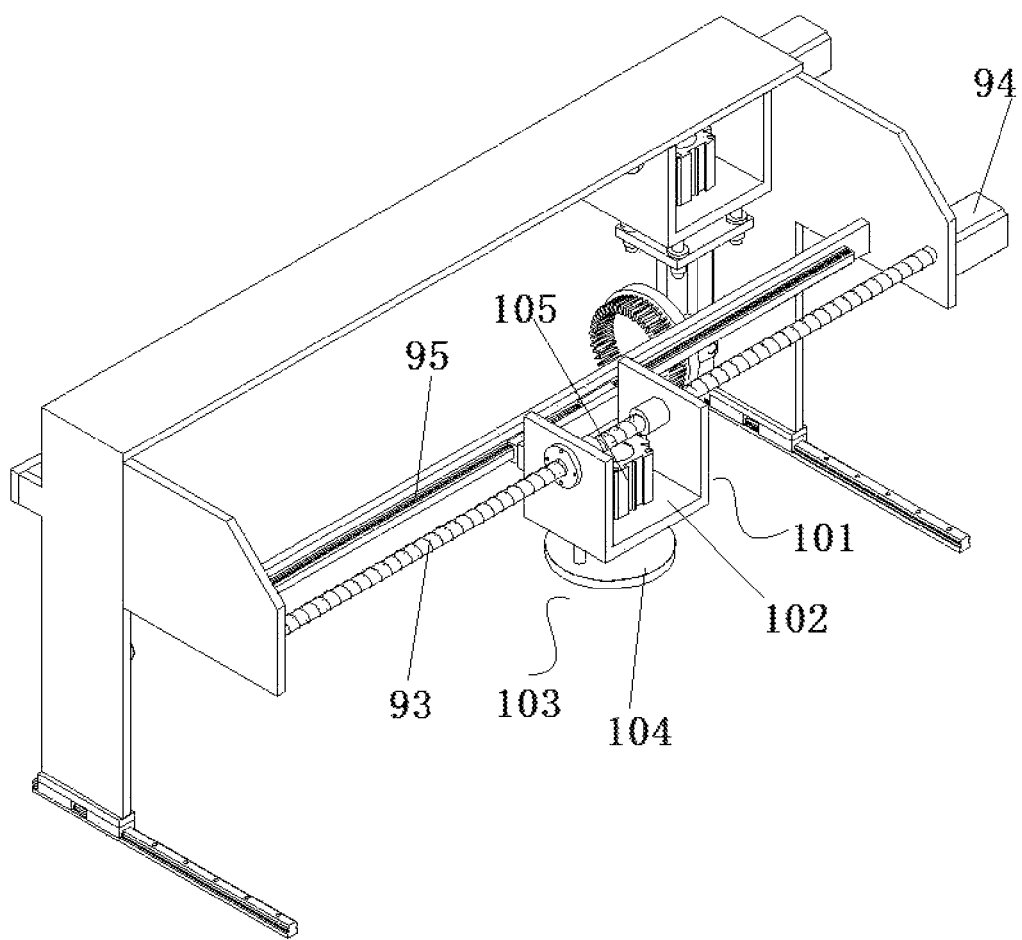
FIG. 3 is another partial schematic diagram of the device for inserting the insulating sleeves into the wiring slots of the flat wire motor stator according to the present invention.
Figure 4:
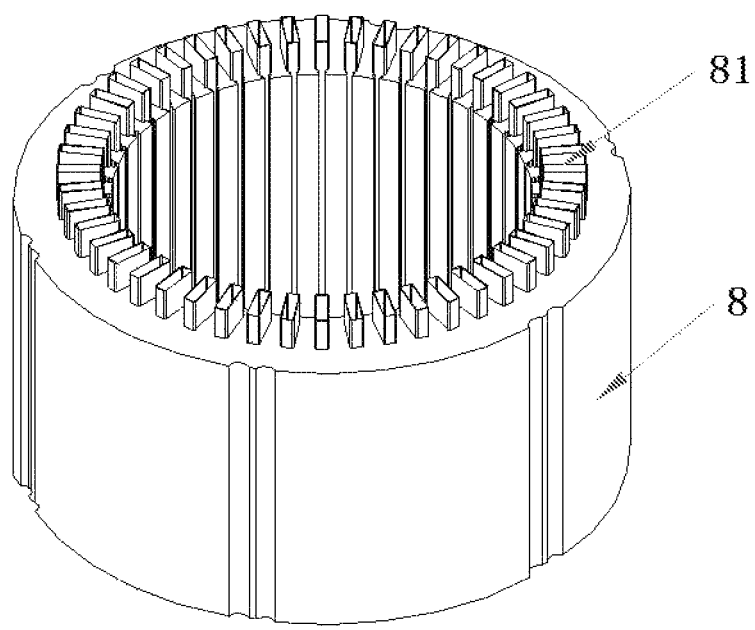
FIG. 4 is a schematic diagram of the flat wire motor stator according to the present invention.

The present invention will be described hereinafter with reference to the embodiments, from which the technical solutions will be clear and complete. Obviously, the described embodiments constitute only a part of the embodiments of the present invention, but not all of the embodiments.

EXAMPLES

Illustrated is a method for inserting insulating sleeves into wiring slots of a flat wire motor stator, as will be described below.

S1: Insulating sleeves matched with the size of wiring slots of a flat wire motor stator are selected, and are pre-processed to a length by cutting according to the size of the flat wire motor stator.

S2: The flat wire motor stator is fixed into a positioning plate set.

S3: The pre-processed insulating sleeves are placed into a feed mechanism, and are conveyed through a conveying mechanism to a positioning mechanism located behind the conveying mechanism.

S4: The insulating sleeves in the positioning mechanism are clamped and transported by a clamping mechanism above the wiring slots of the flat wire motor stator.

S5: A guide mechanism is moved above the flat wire motor stator in the positioning plate set. S5 is synchronized with S4.

S6: The insulating sleeves are inserted, by the clamping mechanism, into the wiring slots of the flat wire motor stator through the guide mechanism.

S7: The insulating sleeves are completely inserted into the wiring slots of the flat wire motor stator by a leveling mechanism.

S8: The processed flat wire motor stator is removed, and another new flat wire motor stator is putted in. These mechanisms are reset. Steps S1 to S7 are repeated.

Further, the insulating sleeves are inserted into the wiring slots of the flat wire motor stator by one, two or more processes.

Further, the insulating sleeve is a spiral composite insulating sleeve, an extruded insulating sleeve or an injection forming insulating sleeve.

Further, the insulating sleeve is any one or two of a carbon fiber insulating sleeve, a glass fiber insulating sleeve, a PET insulating sleeve, a PI insulating sleeve and a plastic insulating sleeve.

A device for inserting insulating sleeves into wiring slots of a flat wire motor stator, comprising a processing panel 1 and a drive mechanism (not marked). A feed mechanism 2, a conveying mechanism 3, a positioning mechanism 4, a clamping mechanism 5, a guide mechanism 6 and a positioning plate set 7 are provided on the processing panel. The feed mechanism is provided on one side of the processing panel and is connected with the conveying mechanism which is provided below the feed mechanism. An end of the conveying mechanism is connected with the positioning mechanism, and one side of the positioning mechanism is provided with the clamping mechanism. The positioning plate set is symmetrically provided on the other side of the processing panel, and one side of the positioning plate set is provided with the guide mechanism. A flat wire motor stator 8 is provided on the positioning plate set. The feed mechanism is connected with a seventh drive mechanism 21.

In the present invention, the drive mechanism comprises a first drive mechanism (not marked), a second drive mechanism (not marked), a third drive mechanism 55, a fourth drive mechanism 94, a fifth drive mechanism 105, a sixth drive mechanism 92 and the seventh drive mechanism 21.

Further, a plurality of first guide rails 11 are symmetrically provided on both sides of the processing panel, and are connected with the first drive mechanism (not marked) which is provided below the first guiding rails. A rack 9 is provided on the first guide rails, and a first positioning rod (not marked) and a first transmission rod (not marked) are symmetrically provided at the rack. The first transmission rod is provided with the clamping mechanism 5 which is connected with the first positioning rod, and the first transmission rod is connected with the sixth drive mechanism 92. A plurality of baffles 91 are symmetrically provided at a front side of the rack, and the second positioning rod 95 and the second transmission rod 93 are symmetrically provided between the baffles.

Further, the conveying mechanism comprises a first conveyor belt 31 and a second conveyor belt 32. The first conveyor belt is connected to the second conveyor belt in an L-shape. Specifically, the first conveyor belt and the second conveyor belt are connected in an L-shaped by a steering mechanism in the prior art for conveying.

Further, a material guide plate 33 is symmetrically provided on the first conveyor belt. Specifically, the material guide plate is V-shaped and is provided on the first conveyor belt, so that insulating conduits are facilitated to slide into a middle of the first conveyor belt.

Further, the positioning mechanism 4 comprises a limit ring 41 and a positioning turntable 42. The positioning turntable is sleeved in the limit ring which is coaxial with the positioning turntable. One side of the limit ring is provided with an opening (not marked) facing an end of the second conveyor belt. Surfaces of the positioning turntable are symmetrically provided with a limit groove 43. The insulating sleeves enter the limit groove of the positioning turntable through the opening of the limit ring, and at the same time, the positioning turntable is continuously rotated until the insulating sleeves fill the limit groove.

Further, the clamping mechanism 5 comprises a drive rod 51. One end of the drive rod is connected with the third drive mechanism 55, and the other end of the drive rod is connected with a rotary part 52 having a clamping member 53, and metal inserts 54 are symmetrically provided on a surface of the clamping member. Specifically, a length of the metal insert is ¼~⅓ of the length of the insulating sleeve, and the metal inserts are fitted with the insulating sleeves in a interference fit, which can ensure a stable clamping of the insulating sleeves, and at the same time, the clamping mechanism can be easily withdrawn after the insulating sleeves are inserted into the wiring slots of the flat wire motor stator. The metal inserts are provided corresponding to the limit groove of the positioning turntable. In the clamping mechanism of the present invention, the drive rod drives the rotary member to be laterally arranged, so that the clamping member faces the positioning mechanism; and then the sixth drive mechanism drives the transmission rod to push the clamping mechanism forward to partially insert the metal inserts into the insulating sleeves. Then the clamping mechanism clamped with the insulating sleeves is reset. The drive rod drives the rotary part to be vertically arranged. The first drive mechanism drives the rack to move forward along the first guide rail, so that the rack is located above the positioning plate set. At the same time, the guide plate of the guiding mechanism is moved above the positioning plate set. The third drive mechanism drives the clamping member to move downwards. The insulating sleeves are inserted into the wiring slots of the flat wire motor stator in the positioning plate set along spaced slots in the guide ring. Specifically, a manner of connecting the clamping mechanism to the first positioning rod and the first transmission rod on the rack is similar to a manner of connecting the leveling mechanism to the second positioning rod and the second transmission rod.

Further, the guide mechanism 6 comprises a plurality of second guide rails 61 opposite to each other. A second drive mechanism (not marked) is provided at a rear of the second guide rails having a guide plate 62, so that the guide plate can move back and forth.

Further, the guide plate is provided with an arc opening 621 having a guide ring 622. The spaced slots are symmetrically provided in the guide ring. The guide plate is configured to provide a guide support force before the insulating sleeves are inserted into the wiring slots of the flat wire motor stator, so that the insulating sleeves are easy to be inserted into the wiring slots of the flat wire motor stator.

Further, the device of the present invention further comprises the leveling mechanism 10 provided above the positioning plate set. The leveling mechanism comprises a horizontal transmission portion 101 provided at the second transmission rod 93, and one end of the horizontal transmission portion is connected to the second positioning rod 95. The horizontal transmission portion is provided with a processing seat 102 provided with a vertical transmission portion 103, and a leveling plate 104 is provide below the vertical transmission portion. The second transmission rod is connected to a fourth drive mechanism 94, and the vertical transmission portion is provided with a fifth drive mechanism 105. When the insulating sleeves have been fully inserted into the wiring slots of the flat wire motor stator, all workpieces are reset for a next repeat cycle. At the same time, the leveling mechanism is moved above the wiring slots of the flat wire motor stator in the positioning plate set to be leveled by the horizontal transmission portion, and then the processing seat is pressed down by the vertical transmission portion, so that the insulating sleeves are fully inserted into the wiring slots of the flat wire motor stator. The leveling mechanism is reset, and the flat wire motor stator is removed from the positioning plate set by a mechanical hand, and a new flat wire motor stator is putted in the positioning plate set, so that it is inserted with the insulating sleeves.

The operation process of the present invention is as follows. The insulating sleeves 81 are put into the feed mechanism, and the motor drives the feed mechanism to vibrate and swing back and forth, so that the insulating sleeves sequentially fall into the first conveyor belt, and then are conveyed to the second conveyor belt in order. Since the second conveyor belt is continuously driven, the insulating sleeves enter the limit groove of the positioning turntable. The insulating sleeves are sequentially arranged at a certain angle by the rotation of the positioning turntable, and then the drive mechanism drives the clamping mechanism to the positioning turntable to take out the insulating sleeves by inserting the metal inserts into the insulating sleeves. The clamping mechanism is moved above the flat wire motor stator in the positioning plate set for inserting the insulating sleeves. Before the insert, the guide mechanism is configured to guide the insulating sleeves, so that the insulting sleeves can be successfully inserted into the wiring slots of the flat wire motor stator 8 in one or multiple times (several strips of the insulating sleeves can be arranged in the stator slot at a same time). When the insulting sleeves are fully inserted into the wiring slots of the flat wire motor stator, the clamping mechanism is withdrawn, and the guide mechanism is removed, and the other mechanisms are reset. The drive mechanism drives the leveling mechanism to level the inserted sleeves according to requirements, and then the flat wire motor stator 8 is removed. The above operation is repeated for inserting the sleeves.

The present invention adopts the inventive method of directly inserting the insulating sleeves into the wiring slots of the flat wire motor stator to replace the conventional method in which the insulating paper sleeve is formed by the insulting paper and then is inserted into the wiring slot of the flat wire motor stator. It can ensure that the insulating sleeves to be inserted have a same size, and there is no gap on the formed insulating sleeves, having a better insulating performance. The present invention greatly improves the processing efficiency by inserting the sleeves into the wiring slots of the flat wire motor stator in batches. Compared to the conventional method in which all wiring slots of the flat wire motor stator is filled in 5 minutes, the method of the present invention can be completed in 10-20 seconds, so that the space factor of the flat wire motor is ensured, providing the flexibility for designing the size of the winding wire.

Obviously, for those skilled in the prior art, the present invention is not limited to the above embodiments, and the present invention can be realized in other specific forms without departing from the spirit and essential characteristics of the present invention. Therefore, the present invention should be considered as exemplary, but not for limiting. The scope of the present invention is limited by the appended claims rather than the above description, therefore, the embodiments aim to include all changes that fall within the meaning and range of equivalents of the claims.

Moreover, it should be understood that although the description has described in terms of embodiments, it doesn't mean that each embodiment only includes one separated technical solution, and the description way of the present invention is merely for the sake of clarity. The specification shall be considered as a whole by those skilled in the prior art, and the technical solutions in different embodiments can be properly combined to form other embodiments which can be understood by those skilled in the prior art. It should be noted that the technical features which are not described in detail in the present invention can be complemented by the prior art.

The invention claimed is:

1. An insulation sleeve insertion device for a flat wire motor stator, comprising:
   a processing panel;

a feeder;

a conveying mechanism comprising conveyor belts;

a positioning mechanism comprising a limit ring and a positioning turntable;

a guide mechanism comprising a plurality of second guide rails;

a clamping mechanism comprising a drive rod;

a positioning plate set; and a drive mechanism comprising a second driver;

wherein the clamping mechanism is configured to insert insulating sleeves into wiring slots of the flat wire motor stator through the guide mechanism; the feeder, the conveying mechanism, the positioning mechanism, the clamping mechanism, the guide mechanism and the positioning plate set are provided on the processing panel; the feeder is provided on one side of the processing panel and is connected with the conveying mechanism provided below the feeder; an end of the conveying mechanism is connected with the positioning mechanism, and one side of the positioning mechanism is provided with the clamping mechanism; the positioning plate set is symmetrically provided on the other side of the processing panel, and one side of the positioning plate set is provided with the guide mechanism; and the plurality of second guide rails are opposite to each other; the second driver is connected to the second guide rails; a guide plate is provided on the second guide rails; an arc shaped opening is provided on the guide plate and is provided with a guide ring; and a plurality of spaced slots are symmetrically provided in the guide ring.

2. The device of claim 1, wherein a plurality of first guide rails are symmetrically provided on both sides of the processing panel, and are connected with a first driver which is provided below the first guide rails; a rack is provided on the first guide rails, and a first positioning rod and a first transmission rod are symmetrically provided on the rack; the first transmission rod is provided with the clamping mechanism which is connected with the first positioning rod; a plurality of baffles are symmetrically provided at a front side of the rack, and a second positioning rod and a second transmission rod are symmetrically provided between the baffles.

3. The device of claim 1, wherein the positioning turntable is sleeved in the limit ring which is coaxial with the positioning turntable; one side of the limit ring is provided with an opening; and a limit groove is provided on an outer curved surface of the positioning turntable.

4. The device of claim 1, wherein one end of the drive rod is connected with a third driver, and the other end of the drive rod is connected with a rotary part having a clamping member, and a plurality of metal inserts are symmetrically provided on a surface of the clamping member, and wherein the metal inserts are configured to be inserted into the insulating sleeves to take out the insulating sleeves from the positioning turntable.

5. The device of claim 2, wherein the device further comprises a leveling mechanism which is provided above the positioning plate set; the leveling mechanism comprises a horizontal transmission portion provided at the second transmission rod; one end of the horizontal transmission portion is connected to the second positioning rod; the horizontal transmission portion has a processing seat provided with a vertical transmission portion, and a leveling plate is provided below the vertical transmission portion; and the second transmission rod is connected to a fourth driver, and the vertical transmission portion is provided with a fifth driver.

* * * * *